United States Patent
Trott

(10) Patent No.: US 7,164,726 B1
(45) Date of Patent: Jan. 16, 2007

(54) BROADCAST BURST USING SPATIAL DIVERSITY FOR A RADIO COMMUNICATIONS SYSTEM

(75) Inventor: Mitchell D. Trott, Mountain View, CA (US)

(73) Assignee: ArrayComm, LLC., San Jose, CA (US)

(*) Notice: Subject to any disclaimer, the term of this patent is extended or adjusted under 35 U.S.C. 154(b) by 795 days.

(21) Appl. No.: 10/187,230

(22) Filed: Jun. 28, 2002

(51) Int. Cl.
*H04L 1/02* (2006.01)
(52) U.S. Cl. .................. 375/267; 455/101
(58) Field of Classification Search ........ 375/260, 375/267, 299; 455/101–103; 370/329–330, 370/331, 334, 341, 337, 347, 350, 344, 458
See application file for complete search history.

(56) References Cited

U.S. PATENT DOCUMENTS

| | | | |
|---|---|---|---|
| 4,747,105 A * | 5/1988 | Wilson et al. .............. 714/707 |
| 5,649,287 A | 7/1997 | Forssen et al. |
| 6,044,086 A * | 3/2000 | Albrow et al. .............. 370/458 |
| 6,084,886 A * | 7/2000 | Dehner et al. .............. 370/458 |
| 6,151,310 A * | 11/2000 | Dent .......................... 370/330 |
| 6,185,440 B1 | 2/2001 | Barratt et al. |
| 6,650,881 B1 * | 11/2003 | Dogan ..................... 455/276.1 |
| 6,804,307 B1 * | 10/2004 | Popovic ..................... 375/299 |

* cited by examiner

*Primary Examiner*—Khanh Tran
(74) *Attorney, Agent, or Firm*—Blakely, Sokoloff, Taylor & Zafman LLP

(57) ABSTRACT

A method and apparatus are provided that allows a single spatially directed broadcast burst to serve users throughout a base station sector. In one embodiment, the invention includes sending a first segment of a broadcast channel burst using a first set of unchanging spatial parameters from an array of antenna elements, and sending a second segment of the broadcast channel burst using a second set of different unchanging spatial parameters from the array of antenna elements.

55 Claims, 3 Drawing Sheets

BROADCAST BURST USING SPATIAL DIVERSITY FOR A RADIO COMMUNICATIONS SYSTEM

BACKGROUND OF THE INVENTION

1. Field of the Invention

The present invention relates generally to the field of digital radio signal communications. More particularly, the invention relates to transmitting segments of a single broadcast burst with different spatial parameters.

2. Description of the Related Art

Mobile radio communications systems such as cellular voice radio systems typically have several base stations in different locations available for use by mobile remote terminals, such as cellular telephones or wireless web devices. Each base station typically is assigned a set of frequencies or channels to use for communications with the remote terminals. The channels are different from those of neighboring base stations in order to avoid interference between neighboring base stations. As a result, the remote terminals can easily distinguish the transmissions received from one base station from the signals received from another. In addition, each base station can act independently in allocating and using the channel resources assigned to it.

Such radio communications systems typically include a broadcast channel (BCH). The BCH is broadcast to all remote terminals whether they are registered on the network or not and informs the remote terminals about the network. In order to access the network, a remote terminal normally tunes to and listens to the BCH before accessing the network. A remote terminal will typically scan a range of likely frequencies when it wants to access the network until it finds the strongest or clearest BCH. It will then use the BCH signal for synchronization and use information in the BCH to request access to the network. Such a request typically results in an exchange of information about the network using separate control and access channels and ends in the remote terminal receiving an assignment to a particular base station.

Because the BCH is transmitted to all potential remote terminals within the range of a particular base station, it is typically broadcast omni-directionally or across a wide simultaneous directional range. This causes a great amount of interference and noise. In a system designed for transmission using spatial parameters, for example, phase and amplitude, across multiple elements of an antenna array, it is difficult to generate a wide area uniform signal from the array.

In order to overcome this difficulty, the BCH can be transmitted several times each with different spatial parameters or weights. However, the remote terminal must then listen to several cycles of the BCH, slowing down measurement and synchronization processes at the remote terminal. Alternatively, the BCH can be transmitted in several simultaneous copies, each using different weights. However, a complex receiver is required at the remote terminal to distinguish the overlapping signals. The complex equalizer must also be trained using a sequence in the BCH, increasing the overhead that the BCH must carry.

BRIEF SUMMARY OF THE INVENTION

A method and apparatus are provided that allows a single spatially directed broadcast burst to serve users throughout a base station sector. In one embodiment, the invention includes sending a first segment of a broadcast channel burst using a first set of unchanging spatial parameters from an array of antenna elements, and sending a second segment of the broadcast channel burst using a second set of different unchanging spatial parameters from the array of antenna elements.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Introduction

The present invention, according to one embodiment, allows for phase and amplitude jumps at particular times in a single broadcast channel burst. In other words, the BCH is divided into segments that can each be sent with different spatial parameters. Changes in the spatial parameters, for example, phase and amplitude jumps are allowed only at particular times in the burst between segments. This structure is exploited at the base station to achieve an omni-directional pattern by changing the transmit weights at the particular times where phase jumps are allowed. A wide broadcast pattern can be covered in a single burst by the combination of all of the segments.

As a result, the remote terminal can measure parameters of the BCH after receiving only a single burst. No training bits are required in the BCH to allow the remote terminal to recover BCH parameters such as phase, gain, or channel impulse response and no prior knowledge of the transmitting array or the signal is required.

Process Flow

Figure 1:
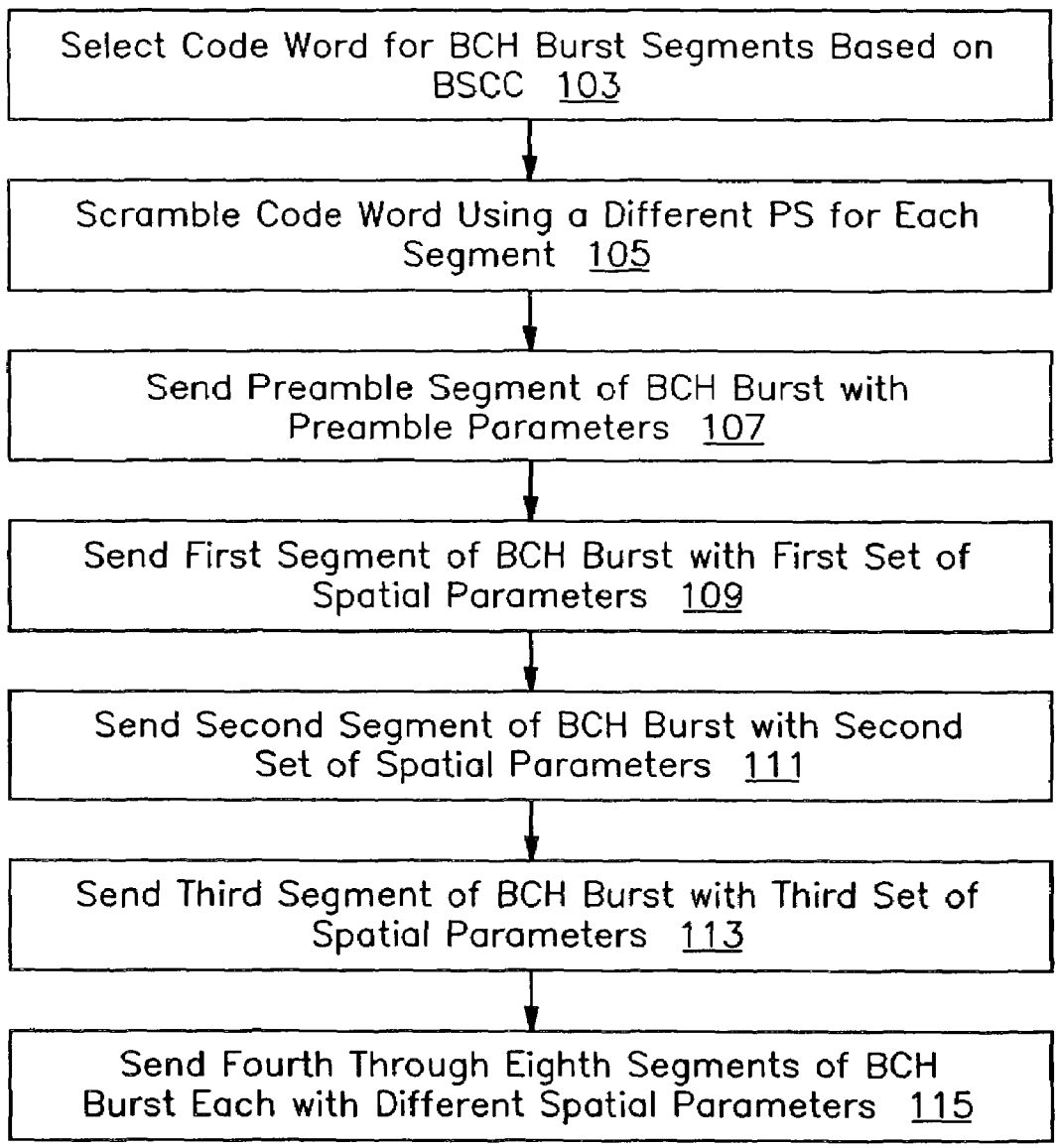
FIG. 1 is a flow chart showing one embodiment of the present invention.

FIG. 1 shows a process flow diagram for building and sending a broadcast channel BCH burst in accordance with the present invention. This process is described in the context of a base station (BS), in a network that includes many base stations, sending a BCH burst to any subscriber stations or remote user terminals that may be within range of the base station.

Initially code words are selected for BCH burst segments based on the base station's BSCC (base station color code) 103. In the present embodiment, each base station is assigned one of 64 different six-bit BSCC's which can be used to distinguish the base station from any nearby base stations. The code word is selected from a group of 64 different code words to be the one representing the appropriate BSCC. However, any other code word or bit sequence can be selected that might contain other information about the base station or the network. In one embodiment, the code words are selected to improve the ability of the user terminal (UT) to demodulate the code word without any training as described in more detail below. One such set of code words is a Walsh-Hadamard code word set.

The selected code word is then scrambled using a different linear congruential pseudorandom number generator sequence 105 for each segment. As an alternative, a LFSR (linear feedback shift register) PS (pseudorandom sequence) can be used. Either one long sequence can be broken into a set of different scrambling codes or a different discrete PS can be used for each segment. The scrambling codes are known to the UT and can be used to differentiate signals from different base stations. The pseudorandom nature provides benefits in improving the auto-correlation properties of the signals. Walsh-Hadamard codes typically have poor auto-correlation properties which are thus compensated by the PS, the peak average power of the BCH.

Having formulated the bit sequence using a code word and scrambling it, the BCH can be modulated and transmitted to any UT's that may be in the vicinity. The BCH may contain many different bursts or the same burst may be transmitted with many repetitions. In the present example, a BCH burst is sent by first sending a preamble segment of the BCH burst with preamble parameters 107. The preamble parameters are a set of spatial parameters, such as different phases and amplitudes to apply to different elements of the transmit antenna array. The spatial parameters can be a transmit weight vector as is used with antenna arrays in SDMA (spatial division multiple access) system.

The BCH burst is continued by sending the first segment of the burst with a first set of spatial parameters 109. In one embodiment, the spatial parameters concentrate the radiated energy in a particular direction with a particular beamwidth. Each segment is transmitted in a different direction with the same or a different beamwidth. However, the spatial parameters need not result in well-defined beams with a particular width.

The second segment of the BCH burst is then sent with a second set of signal parameters 111. The third segment of the BCH burst is sent with a third set of signal parameters 113, and the fourth through eighth segments of the BCH burst are each sent with different spatial parameters 115. The spatial parameters can be selected so that after all eight segments are sent, the entire intended coverage area of the base station has been able to receive at least one segment of the burst. In one example, the spatial parameters for the first four segments are used again in the same order for the last four segments. Accordingly a stationary UT that receives the second segment will also receive the sixth segment. Each will contain the same code word but be scrambled using a different sequence. Alternatively, the intended coverage area can be covered in several different bursts. In the present example, the burst has eight segments, however, the particular number of segments can be varied depending upon the particular needs and desires for a particular system.

The UT having received a segment of the single BCH burst described above, can unambiguously determine a phase for the base station. By unscrambling the code word or words, it can also identify the base station. This allows the UT to receive further base station transmissions without having received any training sequences.

Broadcast Channel Superframe

According to one embodiment of the present invention, communication sessions are initiated for each user terminal or remote terminal from the broadcast channel BCH which is transmitted as a burst from the base station to all potential user terminals. The BCH burst, unlike the TCH (traffic channel) bursts, is transmitted in segments in many different directions where user terminals are likely to be, the specific beam pattern parameters will depend on the network. The BCH communicates enough basic information to enable the UT to gain access to the network by transmitting a message of its own, for example a subsequent exchange of a CR (configuration request) and a CM (configuration message) between the base station and the user terminal.

The BCH also provides good frequency offset and timing update information to all user terminals, even when the BCH is not specifically directed toward any one user terminal in particular. The presently described embodiment has been selected in order to minimize the amount of information transmitted in the BCH as well as to minimize the bit rate. The broadcast channel information symbols provide the information needed for a user terminal to request a configuration message from the base station. They also provide information to guide user terminal handover decisions.

The broadcast logical channel (BCH) provides information that can be used by a UT (user terminal) to open a configuration channel (CCH) to the BS (base station). It also provides information to guide UT handover decisions for handovers to other base stations. The BCH logical channel can be located on a fixed RF (radio frequency) resource, e.g. a particular time slot and frequency, throughout the network of base stations. This fixed RF resource is, in one embodiment, dedicated to BCH and CCH, and is not used for RACH (random access channels) TCH (traffic channels) or other traffic. The other slots which are not dedicated to BCH and CCH can be used for RACH, TCH or any other purpose. In the present example, downlink slot 1 on an RF channel near the middle of the RF allocation is used for BCH and CCH functions. The particular choice of allocations will depend on the available resources and the requirements for overhead traffic.

In one embodiment, an RF allocation of 5 MHz is divided in frequency into 8 RF channels each of width 625 kHz. Each RF channel is divided in time into 5 ms frames. Each frame has 6 slots, 3 for receive and 3 for transmit, in a paired TDD (time-division duplex) arrangement. This particular specific structure has been found to be useful in a paired TDD system, however it can be adapted as desired for TDMA, FDD, and CDMA systems. For high noise environments or for increased robustness, the BCH can hop frequencies according to a predetermined scheme or be repeated on several different frequencies. In another embodiment, the BCH is on its own channel and RACH and other overhead are on a separate control channel. Alternately, one BCH can be provided on a constant frequency and a secondary BCH can be provided on another channel with hopping frequency. The particular details described here are not necessary to obtain the benefit of the invention and many variations are possible.

In detail, each 5 ms frame has the following sequence of fields, where the uplink slots are receive slots used for communication from a user terminal (UT) to a base station (BS) and the downlink slots are transmit slots used for communication from the BS to the UT.:

545 μs for uplink slot 1
545 μs for uplink slot 2
545 μs for uplink slot 3
10 μs guard time
1090 μs for downlink slot 1
1090 μs for downlink slot 2
1090 μs for downlink slot 3
85 μs guard time The BCH logical channel, the first downlink slot in the example above, carries three burst types, called F, T, and B. The F and T bursts in the present example have a reuse of one. All base stations transmit them on the same carrier at the same time. The B burst has a reuse of eight. The superframe structure can be simplified as the following sequence: F T B1 B2 B3 B4 B5 B6 B7 B8. One eighth of the base stations use broadcast slot B5, for example, while all the base stations use F and T.

The repeating superframe structure is shown in more detail is shown in Table 1 below. The superframe has a period of 20 frames.

TABLE 1

| Frame | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Uplink |  | C |  | C |  | C |  | C |  | C |  | C |  | C |  | C |  | C |  | C |
| Down link | F | C | T | C | B0 | C | B1 | C | B2 | C | B3 | C | B4 | C | B5 | C | B6 | C | B7 | C |

As shown in Table 1, even-numbered frames in the superfame are labeled "C" and carry CCH (configuration channel) bursts. Odd-numbered frames carry F, T, or B bursts. There are eight different versions of the B bursts indicated by the symbols B0–B7. The F, T and B bursts are used differently by the base stations of the system. All base stations transmit F and T bursts at the same time in the appropriate frame, once every superframe. The base stations are all synchronized to a GPS (Global Positioning System) receiver reference timing so that they can all transmit at almost exactly the same time.

The frame timing is established by the base stations that are in the area and transmitting on the RF carrier designated for the BCH. The carrier can be searched for or preprogrammed into the user terminals. The base stations, or base station if there is only one, can employ GPS or some other precise common timing reference to establish the frame timing. GPS timing offers the advantage that it is accurately synchronized and inexpensively available to all base stations. This allows the BCH to be shared by all the base stations with only a minimal guard time in the BCH between base stations. Precise timing also allows the remote terminals to make distance-based comparisons of the base stations for selection purposes.

The F and T frames, as described above, are occupied by all of the base stations on each repetition of the superframe. This corresponds to a reuse factor of 1. The B frames, labeled B0–B7, however, have a reuse factor of 8. The B frames are assigned to each base station based on its BSCC (Base Station Color Code), although any other assignment mechanism can be used, as can any other number of different B frames. One benefit of assigning the B bursts is that the base stations that transmit simultaneously on the same burst will be separated from each other by at least one other base station.

In one embodiment, during a frame labeled Bn, only those base stations whose BSCC satisfy the equation, BSCC=n (mod 8), transmit a B burst at the same time. There are 64 base station color codes, numbered 0–63, leading to eight different color codes being simultaneously transmitted by the base stations in any one burst.

A base station can be considered a collection of base station modems serving a group of RF carriers. Alternatively, a base station can be an installation with a set of modems at a single site. For other system configurations each modem modulator/demodulator set can be considered a base station. Each base station is assigned a unique 32-bit base station identifier, BSID. The BSID is used to derive a base station color code which is defined in one embodiment as follows: BSCC=BSID mod 64.

As a function of the BSCC, a base station frequency hops, broadcasts BCH, listens for uplink CR, and sends downlink CM in response to CR. The BSCC can also be used by base stations and terminals to ensure that messages transmitted to and from one base station are not confused with messages transmitted to and from a neighboring base station. Within a geographical region where radio transmissions overlap, the BSCC is uniquely assigned. No base station should be able to routinely see user terminals that are communicating with a base station of the same color code. Likewise, no user terminal should be able to see two base stations that are assigned the same BSCC. A UT should never be in simultaneous communication range of two base stations that have the same BSCC. To help ensure that this occurs, BSCC's that differ by a multiple of 8 can be assigned to non-adjacent base stations. This ensures that the frames labeled B0–B7 in the superframe are received with minimal interference at a UT. The total number of base stations as well as the number of frames in a superframe, the number of slots in a frame and the particular slots used for transmitting BCH bursts, CRs and CMs can be modified to suit particular applications.

Broadcast Channel F Burst

In the present example embodiment, the F burst contains:
10 μs of ramp-up, followed by
1056 μs of symbols f(1)–f(528), followed by
10 μs of ramp-down, followed by
14 μs of guard time.

The symbol period for all bursts (F, T and B) is 2 μs (500,000 symbols per second). Bursts can be transmitted in QPSK (Quarternary Phase Shift Keying), so that the nominal occupied bandwidth is 625 kHz.

The 1056 μs of symbols contains frequency correction symbols that follow a known predictable pattern. As observed at a user terminal, the frequency correction symbols can be a mixture of two complex tones.

Broadcast Channel T Burst

The T burst in this example consists of a short preamble followed by 8 consecutive QPSK signals of length 64 symbols each. Each repeated signal is generated from a code word, such as a Walsh-Hadamard code word, determined as a function of the base station color code (BSCC). The 8 repetitions are scrambled using a scrambling sequence that does not depend on the BSCC. Any scrambling code can be used. A pseudorandom sequence provides overall consistent waveform properties when modulated and can be generated using any of a variety of ways well-known in the art. In one embodiment, a scrambling sequence is generated from a congruential pseudorandom sequence generator.

The T burst in this example is made up of:
10 μs of ramp-up, followed by
32 μs of preamble r(1)–r(16), followed by
1024 μs of symbols t(1)–t(512), followed by
10 μs of ramp-down, followed by
14 μs of guard time.

For the T burst, the preamble is a known sequence of symbols that are adjacent in the QPSK modulation format. A variety of different sequences can be used. The preamble sequence provides some additional ramp-up and guard time. The particular sequence will depend on the modulation format, the quality of the RF channels and other possible intended uses.

The symbols t(1)–t(512) are a function of the BSCC (base station color code). The symbols t(1)–t(512) consist of 8 scrambled repetitions of the selected 64-bit Walsh-Hadamard or other type of code word using QPSK modulation. In one embodiment, each of the 8 scrambled repetitions is transmitted from the base station using a different beam pattern.

Broadcast Channel B Burst

Like the T burst, the B burst in this example consists of a short preamble followed by 8 consecutive QPSK signals of length 64 symbols each. The signals are also modulated code words, such as Walsh-Hadamard code words. A single code word of length 64 is selected as a function of the BCH payload, and is repeated 8 times. Each repetition is scrambled using a linear feedback shift register initialized using a function of the base station color code.

The spatial parameters, for example transmit weights, used to transmit the last four segments of the B burst are the same as the spatial parameters used to transmit the first four segments. Thus any phase change between, e.g., the 1st and 5th segments may be attributed to frequency offset. It's useful that there be a gap in time before the weights are repeated; a longer gap gives a more accurate frequency measurement but reduces the acquisition range of the frequency measurement. While, for example, the 1st and 5th segments of the B burst are transmitted with the same spatial parameters, they are not identical signals. They contain the same Walsh-Hadamard code word scrambled differently.

The B burst consists of:

10 μs of ramp-up, followed by

32 μs of preamble r(1)–r(16), followed by

1024 μs of symbols b(1)–b(512), followed by

10 μs of ramp-down, followed by

14 μs of guard time.

As with the T burst, the preamble for the B burst is a known sequence of symbols that are adjacent in the QPSK modulation format. A variety of different sequences can be used. This sequence helps the UT establish timing. The particular sequence will depend on the modulation format, the quality of the RF channels and other possible intended uses.

The symbols b(1)–b(512) are a function of the base station color code BSCC, the base station transmit power bsTxPwr, and the base station load bsLoad. These symbols can be derived in a variety of different ways. In one example, a six-bit message is defined as p(1)–p(6). The first four bits p(1)–p(4) carry the base station transmit power field bsTx-Pwr. The last two bits carry the bsLoad field.

The bsTxPwr field is interpreted by the UT as the per-antenna transmit power of the B burst. It can be encoded using the formula:

a. $bsTXPwr = 3(p(1) + 2p(2) + 4p(3) + 8p(4))dBm$.

Thus the bsTxPwr fields encodes a power from 0–45 dBm in 3 dB steps. The BStxPwr can be the effective isotropic radiated power of the broadcast message. This number indicates the power transmitted by the base station taking into account the number of amplifiers and diversity antennas available at the base station.

The bsLoad field, encoded in p(5) and p(6), gives an indication of the current traffic load of the base station. The four possible values {p(5),p(6)}={00,10,01,11} indicate light, medium, heavy, and very heavy loading, respectively. BSload is the load on the base station, used by the user terminal to determine how frequently to send random access messages and whether to attempt access. BSload is an indication of the amount of unused capacity the base station has. It can be different from the number of active registered subscribers because subscribers can require different amounts of traffic capacity. BSload represents the transmit and receive bit rates of each modem of the base station over a period of a few minutes measured against maximum possible loading.

To minimize, the data rate of BCH bursts still further, the BSCC and BSload can be removed from the BCH burst. The BCH burst then contains only training or synchronization and BStxPwr, the only information directly related to handover decisions. The user terminal can still distinguish and compare different base stations for selection and handover decisions based on timing of the received BCH bursts. The user terminal can also direct its message requesting access based on timing.

If there are only very few possible power levels for base stations in the system, for example two different transmit power levels, then the two power levels can be distinguished by providing two different training sequences. This allows the BSTxPwr bits to be eliminated. For a single base station system, or if all base stations transmit with the same power, the BSTxPwr bits can also be deleted. If there is only one base station, it is not necessary to evaluate path loss but only whether the signal can be received. The rest of the network information can be learned upon registration.

Having derived the six-bit sequence, this can be used to select a code word, such as a Walsh-Hadamard code word, that will be used to encode the information together with the BSCC as a 64-bit sequence, h(1)–h(64). The code word, h(1)–h(64), is scrambled and transmitted as the symbols b(1)–b(512).

The symbols b(1)–b(512) consist of 8 scrambled repetitions of the code word h(1)–h(64) with QPSK modulation. As with the T burst, the first four repetitions are transmitted from the base station using different beam patterns, and the last four repetitions use the same beam patterns as the first four in the same order. That is, repetitions 0 and 4 use the same beam pattern, repetitions 1 and 5 use the same beam pattern, and so on.

Noncoherent Modulation

The discontinuity in the BCH described above allows the BCH to be transmitted throughout the BS coverage area with minimal interference. However, it causes difficulties for the receiver. The modulation and coding structure of the broadcast burst therefore can be selected to aid the receiver in tolerating the phase and amplitude changes that occur between segments of the burst. This may be achieved in a number of ways.

One way is to include training or pilot data symbols in each segment of the BCH. By comparing the received signal to the known training or pilot symbols, the receiver can estimate the gain and phase of each segment. The gain and phase can then be corrected to some nominal value (such as 1) across the entire received burst. The corrected burst can then be processed ignoring the phase or gain changes.

A disadvantage of pilot symbols is that they expend signal energy that could otherwise be used to transmit information signals. The required number of symbols can be a very large fraction of the burst at the low SNRs (signal to noise ratios) at which a broadcast channel may operate.

Another way to facilitate phase changes between segments is differentially coherent signaling. DPSK (differential phase shift keying), for example, encodes information in the phase changes between successive symbols. If the receiver uses a differential receiver, the sudden phase changes that occur at segment boundaries will result in one or two errors, but the remainder of the segment will be processed correctly. Error correction encoding at the transmitter and error correction at the receiver can be used to repair these errors. However, differential signaling, such as DPSK, has several disadvantages. One disadvantage is the errors that will occur at segment boundaries, described above. Another disadvantage is that a differential receiver has lower performance.

The differential receiver attempts to track phase changes during a segment. In the BCH burst described above, the transmitter transmits each segment using a fixed beam pattern. As a result, the phase does not change significantly during the segment. The use of the differential receiver to receive a message that does not significantly change in phase is wasteful since it degrades performance during the reception of each burst segment.

Another way, which avoids pilot symbols and differential modulation, is to employ noncoherent modulation and coding. This approach does not require phase recovery at the receiver. One type of noncoherent modulation is orthogonal signaling, in which one from a set of M equal-energy orthogonal signals $\{x\_i(t): i=1-M\}$ is selected for transmission in each segment. To transmit a 6-bit message, for example, requires $M=2^6=64$ orthogonal signals.

The orthogonal signals may, for convenience, be defined by the rows of an orthogonal matrix H, where orthogonality means that H times its conjugate transpose $H^*$ is a scaled identity matrix. If the entries of H further take values +1 or −1, the signals may be transmitted using binary phase shift keying, which simplifies the transmitter and receiver. One such matrix H is the Walsh-Hadamard mentioned above.

There is a great variety of different noncoherent orthogonal signaling formats. Some formats also includes noncoherent signaling as a special case, such as PPM (pulse-position modulation) and FSK (frequency shift keying). While code word sets that are orthogonal and equal amplitude work very well for noncoherent signaling, these constraints can be greatly eased. The code words need only be sufficiently uncorrelated that they easily can be distinguished at the receiver. This will depend on the quality of the channel, of the transmitter and of the receiver.

Base Station Structure

In one embodiment as discussed above, the present invention is implemented in an SDMA (Spatial Division Multiple Access) radio data communications system. In such a spatial division system, each terminal is associated with a set of spatial parameters that relate to the radio communications channel between, for example, the base station and a user terminal. The spatial parameters comprise a spatial signature for each terminal. Using the spatial signature and arrayed antennas, the RF energy from the base station can be more precisely directed at a single user terminal, reducing interference with and lowering the noise threshold for other user terminals. Conversely, data received from several different user terminals at the same time can be resolved at lower receive energy levels. With spatial division antennas at the user terminals, the RF energy required for communications can be even less. The benefits are even greater for subscribers that are spatially separated from one another. The spatial signatures can include such things as the spatial location of the transmitters, the directions-of-arrival (DOAs), times-of-arrival (TOAs) and the distance from the base station.

Estimates of parameters such as signal power levels, DOAs, and TOAs can be determined using known training sequences placed in digital data streams for the purpose of channel equalization in conjunction with sensor (antenna) array information. This information is then used to calculate appropriate weights for spatial demultiplexers, multiplexers, and combiners. Techniques well known in the art, can be used to exploit the properties of the training sequences in determining spatial parameters. Further details regarding the use of spatial division and SDMA systems are described, for example, in U.S. Pat. No. 5,828,658, issued Oct. 27, 1998 to Ottersten et al. and U.S. Pat. No. 5,642,353, issued Jun. 24, 1997 to Roy, III et al.

(SDMA) technology can be combined with other multiple access systems, such as time division multiple access (TDMA), frequency division multiple access (FDMA) and code division multiple access (CDMA). Multiple access can be combined with frequency division duplexing (FDD) or time division duplexing (TDD).

Figure 2:
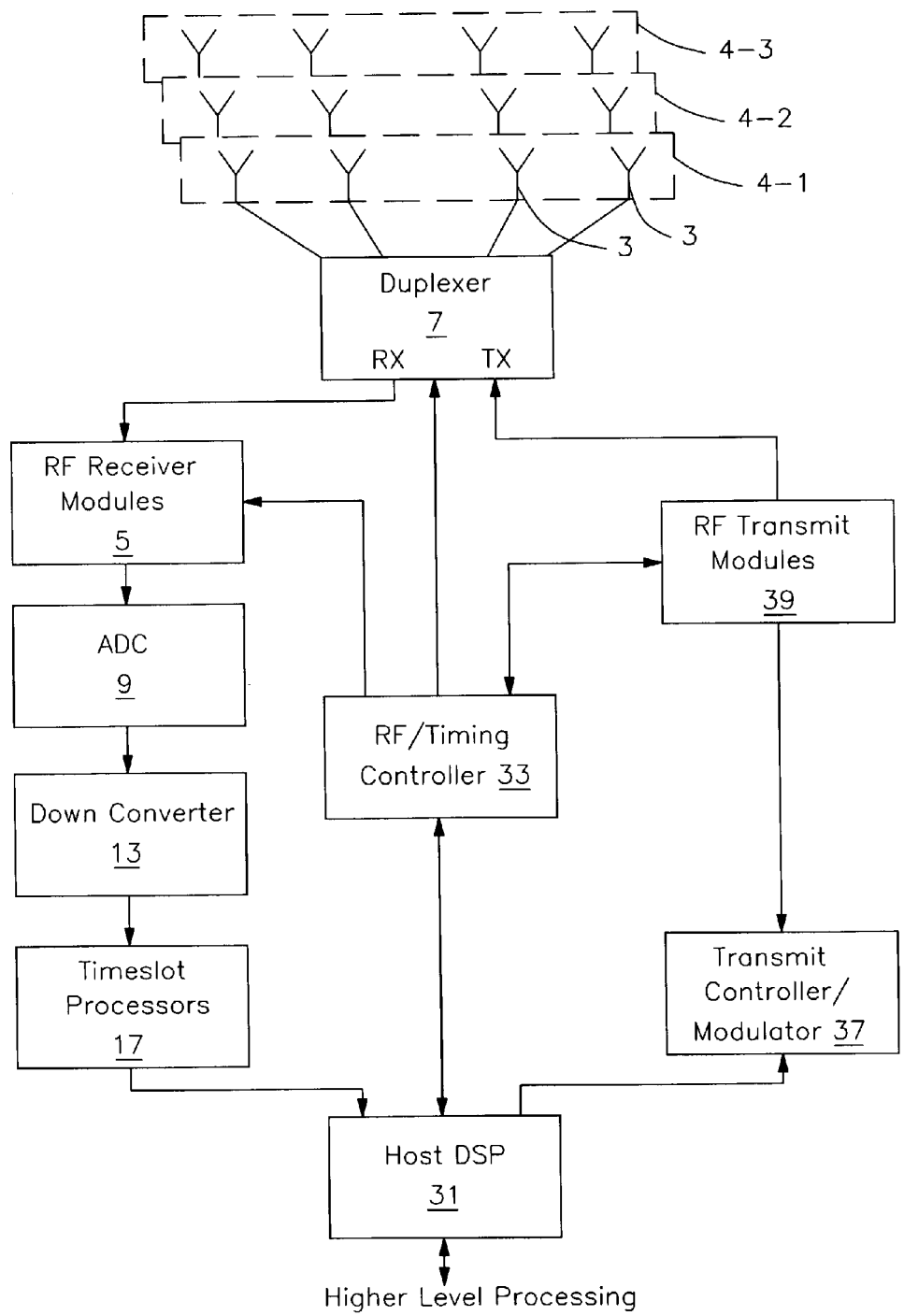
FIG. 2 is a simplified block diagram of a base station on which an embodiment of the invention can be implemented.

FIG. 2 shows an example of a base station of a wireless communications system or network suitable for implementing the present invention. The base station uses SDMA technology which can be combined with other multiple access systems, such as time division multiple access (TDMA), frequency division multiple access (FDMA) and code division multiple access (CDMA). Multiple access can be combined with frequency division duplexing (FDD) or time division duplexing (TDD). The system or network includes a number of subscriber stations, also referred to as remote terminals or user terminals, such as that shown in FIG. 3. The base station may be connected to a wide area network (WAN) through its host DSP 31 for providing any required data services and connections external to the immediate wireless system.

To support spatial diversity, a plurality of antennas 3 is used to form an antenna array 4, for example four antennas, although other numbers of antennas may be selected. Each antenna is an element of a four-element array 4. And a plurality of arrays are provided 4-1, 4-2, 4-3. The antenna elements may have a spacing of from one-quarter to four wavelengths of a typical carrier frequency while the arrays may be separated by ten or twenty wavelengths. The best spacing for spatial diversity will depend upon the particular frequencies involved, the physical installation and other aspects of the system. In many applications, the spacing between antenna elements of each array can be less than two wavelengths of the received signal. The spacing between antenna arrays can be more than two wavelengths of the received signal. In general, the spacing between elements in an array is selected to minimize grating lobes when transmissions from each element are coherently combined. In an alternative approach, the arrays are spaced apart so as to form a uniform array of elements. The distance between nearest elements in different arrays is the same as the spacing between elements within an array. As mentioned above, it is also possible for each array to have only a single element.

A set of spatial multiplexing weights for each subscriber station are applied to the respective modulated signals to produce spatially multiplexed signals to be transmitted by the bank of four antennas. The host DSP 31 produces and maintains spatial signatures for each subscriber station for each conventional channel and calculates spatial multiplexing and demultiplexing weights using received signal measurements. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. The channels used may be partitioned in any manner. In one embodiment the channels used may be partitioned as defined in the GSM (Global System for Mobile Communications) air interface, or any other time division air interface protocol, such as Digital Cellular, PCS (Personal Communication System), PHS (Personal Handyphone System) or WLL (Wireless Local Loop). Alternatively, continuous analog or CDMA channels can be used.

The outputs of the antennas are connected to a duplexer switch 7, which in a TDD embodiment, may be a time switch. Two possible implementations of the duplexer switch are as a frequency duplexer in a frequency division duplex (FDD) system, and as a time switch in a time division duplex (TDD) system. When receiving, the antenna outputs are connected via the duplexer switch to a receiver 5, and are converted down in analog by RF receiver ("RX") modules 5 from the carrier frequency to an FM intermediate frequency ("IF"). This signal then is digitized (sampled) by analog to digital converters ("ADCs") 9. Final down-converting to baseband is carried out digitally. Digital filters can be used to implement the down-converting and the digital filtering, the latter using finite impulse response (FIR) filtering techniques. This is shown as block 13. The invention can be adapted to suit a wide variety of RF and IF carrier frequencies and bands.

There are, in the example of GSM, eight down-converted outputs from each antenna's digital filter 13, one per receive timeslot. The particular number of timeslots can be varied to suit network needs. While GSM uses eight uplink and eight downlink timeslots for each TDMA frame, desirable results can also be achieved with any number of TDMA timeslots for the uplink and downlink in each frame. For each of the eight receive timeslots, the four down-converted outputs from the four antennas are fed to a digital signal processor (DSP) 31 an ASIC (Application Specific Integrated Circuit) or FPGA (Field Programmable Gate Array) (hereinafter "timeslot processor") for further processing, including calibration, according to one aspect of this invention. For TDMA signals, eight Motorola DSP56300 Family DSPs can be used as timeslot processors, one per receive timeslot. The timeslot processors 17 monitor the received signal power and estimate the frequency offset and time alignment. They also determine smart antenna weights for each antenna element. These are used in the SDMA scheme to determine a signal from a particular remote user and to demodulate the determined signal. In a WCDMA system, the channels may be separated using codes in an FPGA and then further processed separately perhaps using separate DSPs for different users. Instead of being timeslot processors the processors are channel processors.

The output of the timeslot processors 17 is demodulated burst data for each of the eight receive timeslots. This data is sent to the host DSP processor 31 whose main function is to control all elements of the system and interface with the higher level processing, which is the processing which deals with what signals are required for communications in all the different control and service communication channels defined in the system's communication protocol. The host DSP 31 can be a Motorola DSP56300 Family DSP. In addition, timeslot processors send the determined receive weights for each user terminal to the host DSP 31. The host DSP 31 maintains state and timing information, receives uplink burst data from the timeslot processors 17, and programs the timeslot processors 17. In addition it decrypts, descrambles, checks error correcting code, and deconstructs bursts of the uplink signals, then formats the uplink signals to be sent for higher level processing in other parts of the base station.

Furthermore DSP 31 may include a memory element to store data, instructions, or hopping functions or sequences. Alternatively, the base station may have a separate memory element or have access to an auxiliary memory element. With respect to the other parts of the base station it formats service data and traffic data for further higher processing in the base station, receives downlink messages and traffic data from the other parts of the base station, processes the downlink bursts and formats and sends the downlink bursts to a transmit controller/modulator, shown as 37. The host DSP also manages programming of other components of the base station including the transmit controller/modulator 37 and the RF timing controller shown as 33. The RF controller 33 reads and transmits power monitoring and control values, controls the duplexer 7 and receives timing parameters and other settings for each burst from the host DSP 31.

The transmit controller/modulator 37, receives transmit data from the host DSP 31. The transmit controller uses this data to produce analog IF outputs which are sent to the RF transmitter (TX) modules 39. Specifically, the received data bits are converted into a complex modulated signal, up-converted to an IF frequency, sampled, multiplied by transmit weights obtained from host DSP 31, and converted via digital to analog converters ("DACs") which are part of transmit controller/modulator 37 to analog transmit waveforms. The analog waveforms are sent to the transmit modules 39. The transmit modules 39 up-convert the signals to the transmission frequency and amplify the signals. The amplified transmission signal outputs are sent to antennas 3 via the duplexer/time switch 7. In a CDMA system, the signals may also be spread and scrambled using appropriate codes.

User Terminal Structure

Figure 3:
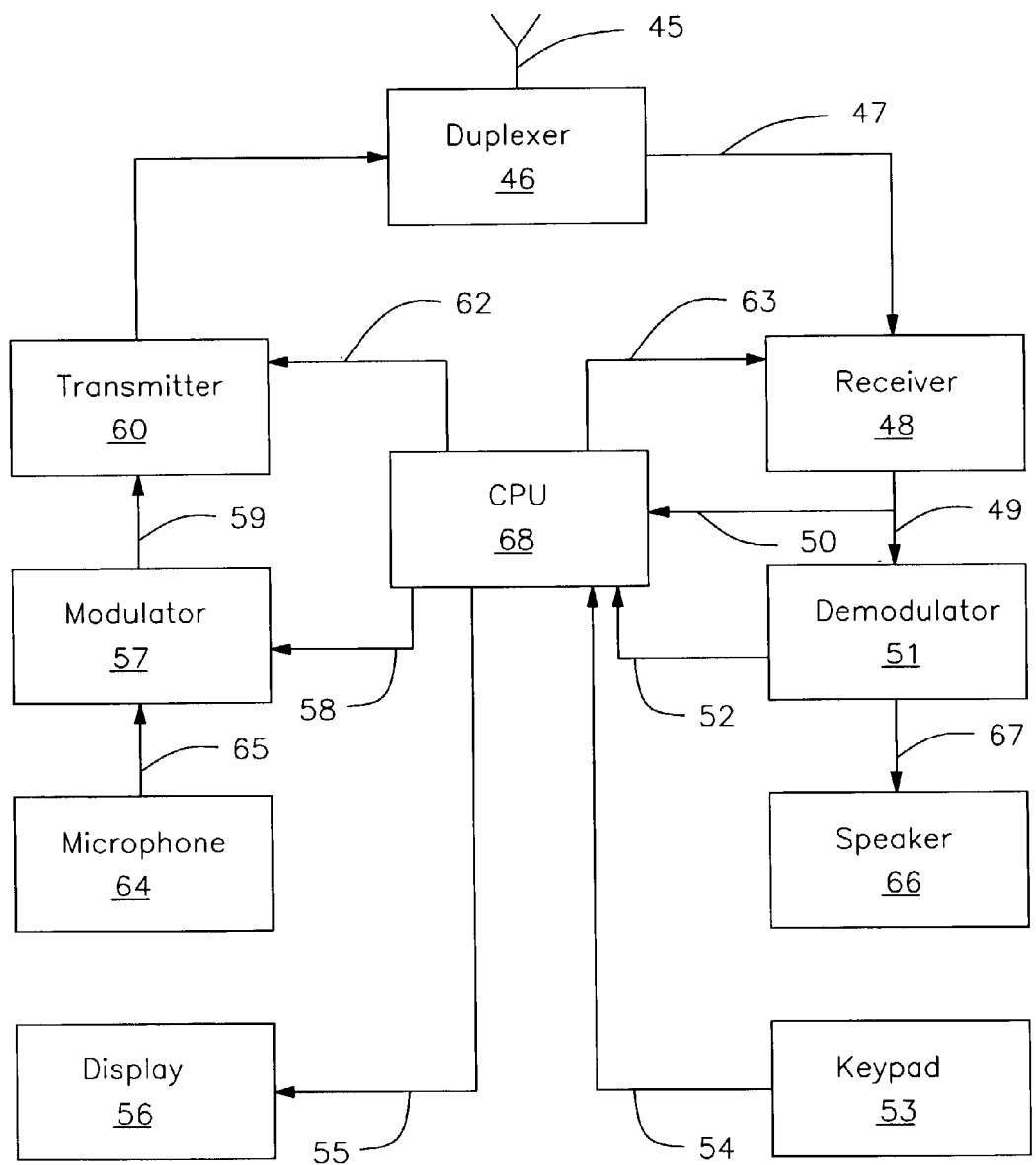
FIG. 3 is a block diagram of a remote terminal on which an embodiment of the invention can be implemented.

FIG. 3 depicts an example component arrangement in a remote terminal that provides data or voice communication. The remote terminal's antenna 45 is connected to a duplexer 46 to permit the antenna 45 to be used for both transmission and reception. The antenna can be omni-directional or directional. For optimal performance, the antenna can be made up of multiple elements and employ spatial processing as discussed above for the base station. In an alternate embodiment, separate receive and transmit antennas are used eliminating the need for the duplexer 46. In another alternate embodiment, where time division duplexing is used, a transmit/receive (TR) switch can be used instead of a duplexer as is well known in the art. The duplexer output 47 serves as input to a receiver 48. The receiver 48 produces a down-converted signal 49, which is the input to a demodulator 51. A demodulated received sound or voice signal 67 is input to a speaker 66.

The remote terminal has a corresponding transmit chain in which data or voice to be transmitted is modulated in a modulator 57. The modulated signal to be transmitted 59, output by the modulator 57, is up-converted and amplified by a transmitter 60, producing a transmitter output signal 61. The transmitter output 61 is then input to the duplexer 46 for transmission by the antenna 45.

The demodulated received data 52 is supplied to a remote terminal central processing unit 68 (CPU) as is received data before demodulation 50. The remote terminal CPU 68 can be implemented with a standard DSP (digital signal processor) device such as a Motorola series 56300 Family DSP. This DSP can also perform the functions of the demodulator 51 and the modulator 57. The remote terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 and the demodulator 51 through lines 65 and 67, respectively for a voice communications remote terminal. In another embodiment, the microphone and speaker are also in direct communication with the CPU to provide voice or data communications. Furthermore remote terminal CPU 68 may also include a memory element to store data, instructions, and hopping functions or sequences. Alternatively, the remote terminal may have a separate memory element or have access to an auxiliary memory element.

In one embodiment, the speaker 66, and the microphone 64 are replaced or augmented by digital interfaces well-known in the art that allow data to be transmitted to and from an external data processing device (for example, a computer). In one embodiment, the remote terminal's CPU is coupled to a standard digital interface such as a PCMCIA interface to an external computer and the display, keyboard, microphone and speaker are a part of the external computer. The remote terminal's CPU 68 communicates with these components through the digital interface and the external computer's controller. For data only communications, the microphone and speaker can be deleted. For voice only communications, the keyboard and display can be deleted.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known circuits, structures, devices, and techniques have been shown in block diagram form or without detail in order not to obscure the understanding of this description.

The present invention includes various steps. The steps of the present invention may be performed by hardware components, such as those shown in FIGS. 2 and 3, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, many of the steps described as being performed by the base station may be performed by the user terminal and vice versa. Furthermore, the invention is equally applicable to systems in which terminals communicate with each other without either one being designated as a base station, a user terminal, a remote terminal or a subscriber station. Thus, the present invention is equally applicable and useful in a peer-to-peer wireless network of communications devices using spatial processing. These devices may be cellular phones, PDA's, laptop computers, or any other wireless devices. Generally, since both the base stations and the terminals use radio waves, these communications devices of wireless communications networks may be generally referred to as radios.

In portions of the description above, only the base station is described as performing spatial processing using adaptive antenna arrays. However, the user terminals can also contain antenna arrays, and can also perform spatial processing both on receiving and transmitting (uplink and downlink) within the scope of the present invention.

Furthermore, in portions of the description above, certain functions performed by a base station could be coordinated across the network, to be performed cooperatively with a number of base stations. For example, each base station antenna array could be a part of a different base station. The base station's could share processing and transceiving functions. Alternatively, a central base station controller could perform many of the functions described above and use the antenna arrays of one or more base stations to transmit and receive signals.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A method comprising:
   sending a first time segment of a broadcast channel burst using a first set of unchanging spatial parameters from an array of antenna elements; and
   sending a second time segment of the broadcast channel burst using a second set of different unchanging spatial parameters from the array of antenna elements.

2. The method of claim 1, wherein the first and second broadcast burst segments are adjacent.

3. The method of claim 1, wherein the first and second broadcast burst segments are separated by a time interval.

4. The method of claim 1, wherein the spatial parameters comprise relative phases and amplitudes across the elements of the antenna array.

5. The method of claim 1, wherein the spatial parameters are selected to direct energy of each segment of the burst in a different direction.

6. The method of claim 1, further comprising sending a third segment of the broadcast channel burst using a third set of different unchanging spatial parameters from the array of antenna elements, the first, second, and third segments containing the same number of symbols.

7. The method of claim 6, wherein the second and third broadcast burst segments are adjacent.

8. The method of claim 1, wherein sending the first segment comprises sending the first segment with a selected modulation format and wherein sending the second segment comprises sending the second segment also with the selected modulation format.

9. The method of claim 1, wherein the first segment is scrambled with a scrambling code and the second segment is scrambled with a second different scrambling code.

10. The method of claim 9, wherein the scrambling codes comprise pseudo-random sequences.

11. The method of claim 10, wherein the pseudo-random sequences are generated using a linear feedback shift register.

12. The method of claim 1, wherein the first and second segments each contain a sequence of symbols, the symbols for each segment being based on the same bit sequence, the bit sequence being scrambled differently for each segment.

13. A method comprising:
   sending a first segment of a broadcast channel burst using a first set of unchanging spatial parameters from an array of antenna elements;
   sending a second segment of the broadcast channel burst using a second set of different unchanging spatial parameters from the array of antenna elements; and
   sending a preamble segment of the broadcast channel burst using a third set of different unchanging spatial parameters from the array of antenna elements, the preamble segment being adjacent to and before the first segment.

14. A method comprising:
   sending a first segment of a broadcast channel burst using a first set of unchanging spatial parameters from an array of antenna elements;
   sending a second segment of the broadcast channel burst using a second set of different unchanging spatial parameters from the array of antenna elements,
   wherein the first and second segments each contain a sequence of symbols, the symbols for each segment being selected from a code word of a set of code words.

15. The method of claim 14 wherein the first and second segments contain no training sequences.

16. The method of claim 14, wherein the broadcast channel burst contains no training sequences sent using the first set of unchanging spatial parameters.

17. The method of claim 14, wherein each code word of the set of code words has the same total amplitude in the modulation space in which the burst is transmitted.

18. The method of claim 14, wherein each code word in the set of code words, if modulated onto the broadcast channel, would have the same average amplitude.

19. The method of claim 14, wherein each code word in the set of code words is orthogonal to each other code word.

20. The method of claim 14, wherein each code word of the set of code words has the same phase distance from the next closest code word in the modulation space in which the burst is transmitted.

21. The method of claim 14, wherein the set of code words is selected so that each code word has no more than a selected amount of correlation to each other code word.

22. The method of claim 14, wherein each code word in the set of code words is substantially uncorrelated to each other code word.

23. The method of claim 14, wherein the set of code words comprises a Walsh-Hadamard set of code words.

24. The method of claim 14, wherein the predetermined set of code words is associated with a particular broadcast channel radio of a plurality of different broadcast channel radios.

25. A machine-readable medium having stored thereon data representing instructions which, when executed by a machine, cause the machine to perform operations comprising:
   sending a first time segment of a broadcast channel burst using a first set of unchanging spatial parameters from an array of antenna elements; and
   sending a second time segment of the broadcast channel burst using a second set of different unchanging spatial parameters from the array of antenna elements.

26. The medium of claim 25, wherein the first and second broadcast burst segments are adjacent.

27. The medium of claim 25, wherein the first and second broadcast burst segments are separated by a time interval.

28. The medium of claim 25, wherein the spatial parameters comprise relative phases and amplitudes across the elements of the antenna array.

29. The medium of claim 25, further comprising sending a third segment of the broadcast channel burst using a third set of different unchanging spatial parameters from the array of antenna elements, the first, second, and third segments containing the same number of symbols.

30. The medium of claim 25, further comprising instructions which, when executed by the machine, cause the machine to perform further operations comprising sending a preamble segment of the broadcast channel burst using a third set of different unchanging spatial parameters from the array of antenna elements, the preamble segment being adjacent to and before the first segment.

31. The medium of claim 25, wherein the first segment is scrambled with a scrambling code and the second segment is scrambled with a second different scrambling code.

32. The medium of claim 25, wherein the first and second segments each contain a sequence of symbols, the symbols for each segment being based on the same bit sequence, the bit sequence being scrambled differently for each segment.

33. The medium of claim 25, wherein the first and second segments each contain a sequence of symbols, the symbols for each segment being selected from a code word of a set of code words.

34. The medium of claim 33, wherein each code word of the set of code words has the same total amplitude in the modulation space in which the burst is transmitted.

35. The medium of claim 33, wherein each code word in the set of code words is orthogonal to each other code word.

36. A broadcast channel burst comprising:
a first segment corresponding to a first set of unchanging spatial parameters for an array of antenna elements; and
a second segment corresponding to a second set of different unchanging spatial parameters for the array of antenna elements.

37. The burst of claim 36, wherein the first and second broadcast burst segments are adjacent.

38. The burst of claim 36, wherein the spatial parameters comprise relative phases and amplitudes for the elements of the antenna array.

39. The burst of claim 36, further comprising a third segment corresponding to a third set of different unchanging spatial parameters for the array of antenna elements, the first, second, and third segments containing the same number of symbols.

40. The bust of claim 36, further comprising a preamble segment corresponding to a third set of different unchanging spatial parameters for the array of antenna elements, the preamble segment being adjacent to and before the first segment.

41. The burst of claim 36, wherein the first and second segments each contain a sequence of symbols, the symbols for each segment being based on the same bit sequence, the bit sequence being scrambled differently for each segment.

42. A broadcast channel burst comprising:
a first segment corresponding to a first set of unchanging spatial parameters for an array of antenna elements;
a second segment corresponding to a second set of different unchanging spatial parameters for the array of antenna elements,
wherein the first and second segments each contain a sequence of symbols, the symbols for each segment being selected from a code word of a set of code words.

43. The burst of claim 42, wherein the first and second segments contain no training sequences.

44. The burst of claim 42, containing no training sequences corresponding to the first set of unchanging spatial parameters.

45. The burst of claim 42, wherein each code word in the set of code words, if modulated onto a broadcast channel, would have the same average amplitude.

46. The burst of claim 42, wherein the predetermined set of code words is associated with a particular broadcast channel radio of a plurality of different broadcast channel radios.

47. A cellular base station comprising:
register to store a plurality of code words;
a processor to select one of the plurality of code words and generate a first segment of a broadcast channel burst by scrambling the code word with a first scrambling sequence and to generate a second segment of a broadcast channel burst by scrambling the code word with a second scrambling sequence; and
a transmitter to send the first segment using a first set of unchanging spatial parameters, the second segment using a second set of different unchanging spatial parameters from an array of antenna elements.

48. The base station of claim 47, wherein the transmitter sends the first and second broadcast burst segments separated by a time interval.

49. The base station of claim 47, wherein the spatial parameters are selected to direct energy of each segment of the burst in a different direction.

50. The base station of claim 47, wherein the processor further generates a preamble segment of the broadcast channel burst without using the selected code word and wherein the transmitter sends the preamble segment using a third set of different unchanging spatial parameters from the array of antenna elements, the preamble segment being adjacent to and before the first segment.

51. The base station of claim 47, further comprising a modulator to modulate the first segment and the second segment using a single modulation format.

52. The base station of claim 47, further comprising a linear feedback shift register to generate pseudo-random sequences for use as scrambling codes.

53. The base station of claim 47, wherein each code word of the set of code words has the same total amplitude in the modulation space in which the burst is transmitted.

54. The base station of claim 47, wherein each code word in the set of code words, if modulated onto the broadcast channel, would have the same average amplitude.

55. The base station of claim 47, wherein the set of code words comprises a Walsh-Hadamard set of code words.

* * * * *